(12) United States Patent
Suciu et al.

(10) Patent No.: US 9,617,009 B2
(45) Date of Patent: Apr. 11, 2017

(54) ATR FULL RING SLIDING NACELLE (71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 546 days.

(21) Appl. No.: 14/187,021

(22) Filed: Feb. 21, 2014

(65) Prior Publication Data
US 2015/0125284 A1 May 7, 2015

Related U.S. Application Data (60) Provisional application No. 61/768,176, filed on Feb. 22, 2013, provisional application No. 61/768,179, (Continued)

(51) Int. Cl.
F01D 25/24 (2006.01)
B64D 29/06 (2006.01)
(Continued)

(52) U.S. Cl.
CPC ............ B64D 29/06 (2013.01); F01D 9/02 (2013.01); F01D 25/28 (2013.01); F01D 25/24 (2013.01); F05D 2220/32 (2013.01); F05D 2230/70 (2013.01); F05D 2230/72 (2013.01); F05D 2230/80 (2013.01); F05D 2240/121 (2013.01); F05D 2240/122 (2013.01); F05D 2240/128 (2013.01); F05D 2240/1281 (2013.01);
(Continued)

(58) Field of Classification Search
CPC ........ F01D 25/28; F01D 9/02; F05D 2240/14; F05D 2240/121; F05D 2240/122; F05D 2250/34; Y10T 29/49721
See application file for complete search history.

(56) References Cited

U.S. PATENT DOCUMENTS 2,282,552 A 5/1942 Banowetz
2,526,791 A 10/1950 Wroblewski
(Continued)

FOREIGN PATENT DOCUMENTS

EP 0515263 B1 8/1994
EP 0756078 A1 1/1997
(Continued)

Primary Examiner — Ninh H Nguyen
(74) Attorney, Agent, or Firm — Kinney & Lange, P.A.

(57) ABSTRACT

A gas turbine engine includes a core, a first annular portion, a rail, and a second annular portion. The first annular portion is stationary and adapted for partially surrounding an engine core. The first annular portion includes a fore pylon connecting portion, and a fore bi-fi. The rail is coupled to the fore pylon portion and extending in the aft direction from the stationary portion. The second annular portion is arranged aft of the first portion and coupled to the rail. The second annular portion is movable along an engine core centerline between a closed position and at least one open position. The second annular portion comprises an aft bi-fi configured to engage with the fore bi-fi when the gas turbine engine is in the closed position.

15 Claims, 6 Drawing Sheets

Related U.S. Application Data filed on Feb. 22, 2013, provisional application No. 61/768,184, filed on Feb. 22, 2013, provisional application No. 61/770,719, filed on Feb. 28, 2013, provisional application No. 61/770,729, filed on Feb. 28, 2013, provisional application No. 61/770,735, filed on Feb. 28, 2013.

(51) Int. Cl.
*F01D 25/28* (2006.01)
*F01D 9/02* (2006.01)

(52) U.S. Cl.
CPC ...... *F05D 2240/14* (2013.01); *F05D 2240/55* (2013.01); *F05D 2240/91* (2013.01); *F05D 2250/192* (2013.01); *F05D 2250/292* (2013.01); *F05D 2250/294* (2013.01); *F05D 2250/34* (2013.01); *F05D 2250/75* (2013.01); *F05D 2260/96* (2013.01); *Y10T 29/49721* (2015.01)

(56) References Cited

U.S. PATENT DOCUMENTS

| | | | |
|---|---|---|---|
| 3,067,968 A | 12/1962 | Heppenstall | |
| 3,601,992 A | 8/1971 | Maison | |
| 3,614,037 A | 10/1971 | Vdolek | |
| 3,699,682 A | 10/1972 | Kleckner | |
| 4,196,856 A | 4/1980 | James | |
| 4,278,220 A | 7/1981 | Johnston et al. | |
| 4,410,152 A | 10/1983 | Kennedy et al. | |
| 4,442,987 A | 4/1984 | Legrand et al. | |
| 4,485,970 A | 12/1984 | Fournier et al. | |
| 4,825,644 A | 5/1989 | Bubello | |
| 4,894,985 A | 1/1990 | Dubois et al. | |
| 4,920,744 A * | 5/1990 | Garcia | B64D 29/08 244/54 |
| 4,960,243 A | 10/1990 | Dubois et al. | |
| 5,039,171 A | 8/1991 | Lore | |
| 5,090,197 A | 2/1992 | Dubois | |
| 5,110,069 A | 5/1992 | Webb | |
| 5,117,630 A | 6/1992 | Cariola et al. | |
| 5,267,438 A | 12/1993 | Bunel | |
| 5,315,821 A | 5/1994 | Dunbar et al. | |
| 5,497,961 A | 3/1996 | Newton | |
| 5,609,313 A | 3/1997 | Cole et al. | |
| 5,642,960 A | 7/1997 | Salice | |
| 5,722,231 A | 3/1998 | Porte | |
| 5,863,014 A | 1/1999 | Standish | |
| 5,941,061 A | 8/1999 | Sherry et al. | |
| 5,970,704 A | 10/1999 | Lardy et al. | |
| 5,974,783 A | 11/1999 | Gonidec et al. | |
| 6,079,201 A | 6/2000 | Jean | |
| 6,151,884 A | 11/2000 | Gonidec et al. | |
| 6,170,255 B1 | 1/2001 | Gonidec et al. | |
| 6,179,249 B1 | 1/2001 | Canadas | |
| 6,296,495 B1 | 10/2001 | Wang et al. | |
| 6,340,135 B1 | 1/2002 | Barton | |
| 6,568,172 B2 | 5/2003 | Jannetta et al. | |
| 6,688,099 B2 | 2/2004 | Lair | |
| 6,786,038 B2 | 9/2004 | Lair | |
| 6,968,675 B2 | 11/2005 | Ramlaoui et al. | |
| 7,127,880 B2 | 10/2006 | Lair et al. | |
| 7,484,356 B1 | 2/2009 | Lair | |
| 7,784,735 B2 | 8/2010 | Marche | |
| 7,784,765 B2 | 8/2010 | Ichikawa et al. | |
| 7,959,106 B2 | 6/2011 | Guibert et al. | |
| 7,959,107 B2 | 6/2011 | Beaufort | |
| 8,002,217 B2 | 8/2011 | Sternberger | |
| 8,015,797 B2 | 9/2011 | Lair | |
| 8,052,085 B2 | 11/2011 | Lair | |
| 8,091,827 B2 | 1/2012 | Lair | |
| 8,172,175 B2 | 5/2012 | Lair | |
| 8,181,905 B2 | 5/2012 | McDonough et al. | |
| 8,220,738 B2 | 7/2012 | Calder et al. | |
| 8,226,027 B2 | 7/2012 | Journade et al. | |
| 8,418,436 B2 | 4/2013 | Pero et al. | |
| 8,951,006 B2 * | 2/2015 | Vauchel | B64D 29/08 415/126 |
| 9,188,026 B2 * | 11/2015 | Calder | B64D 29/06 |
| 2003/0218094 A1 | 11/2003 | Lair | |
| 2005/0039438 A1 | 2/2005 | Lair | |
| 2005/0084325 A1 | 4/2005 | O'Brien et al. | |
| 2005/0151012 A1 | 7/2005 | Lair | |
| 2006/0288688 A1 | 12/2006 | Lair | |
| 2008/0072570 A1 | 3/2008 | Lair | |
| 2008/0098720 A1 | 5/2008 | Watson | |
| 2008/0302083 A1 * | 12/2008 | Sloan | F02K 1/386 60/226.1 |
| 2009/0260344 A1 | 10/2009 | Hoyland | |
| 2009/0288386 A1 | 11/2009 | Marshall et al. | |
| 2009/0313969 A1 | 12/2009 | Lair et al. | |
| 2010/0008772 A1 | 1/2010 | Vauchel et al. | |
| 2010/0107599 A1 | 5/2010 | Vauchel | |
| 2010/0139242 A1 | 6/2010 | Vauchel et al. | |
| 2010/0170984 A1 | 7/2010 | Journade | |
| 2010/0270428 A1 | 10/2010 | Murphy | |
| 2011/0101159 A1 | 5/2011 | Lair et al. | |
| 2011/0167790 A1 | 7/2011 | Cloft et al. | |
| 2011/0318173 A1 | 12/2011 | Ramlaoui et al. | |
| 2012/0005999 A1 | 1/2012 | Pero et al. | |
| 2012/0067024 A1 | 3/2012 | Vauchel | |
| 2012/0067975 A1 | 3/2012 | Vauchel | |
| 2012/0073263 A1 | 3/2012 | Kohlenberg et al. | |
| 2012/0325930 A1 | 12/2012 | Pero et al. | |
| 2013/0216297 A1 | 8/2013 | Albach | |
| 2013/0219002 A1 | 8/2013 | Li et al. | |
| 2014/0239083 A1 | 8/2014 | Suciu | |
| 2014/0239084 A1 | 8/2014 | Chandler | |
| 2015/0121839 A1 | 5/2015 | Chandler et al. | |

FOREIGN PATENT DOCUMENTS

| | | |
|---|---|---|
| EP | 0756557 B1 | 5/1998 |
| EP | 0728934 B1 | 5/1999 |
| EP | 0761947 B1 | 5/2000 |
| EP | 0771945 B1 | 1/2001 |
| EP | 0789140 B1 | 11/2001 |
| EP | 0822327 B1 | 8/2003 |
| EP | 2399827 A2 | 12/2011 |
| EP | 1507971 B1 | 1/2012 |
| EP | 1676024 B1 | 10/2012 |
| WO | WO9528318 A1 | 10/1995 |
| WO | WO03100241 A1 | 12/2003 |
| WO | WO2007123556 A2 | 11/2007 |
| WO | 2011014346 A2 | 2/2011 |

* cited by examiner

ATR FULL RING SLIDING NACELLE

CROSS-REFERENCE TO RELATED APPLICATION(S)

This application claims priority to U.S. Provisional Application No. 61/768,176, filed on Feb. 22, 2013, and entitled "ATR FULL RING SLIDING NACELLE," the disclosure of which is incorporated by reference in its entirety. This application also claims priority to U.S. Provisional Application No. 61/768,179, filed on Feb. 22, 2013, and entitled "ATR SLIDING NACELLE WITH THRUST REVERSER," the disclosure of which is incorporated by reference in its entirety. This application also claims priority to U.S. Provisional Application No. 61/768,184, filed on Feb. 22, 2013, and entitled "ATR INTEGRATED NOZZLE AND PLUG," the disclosure of which is incorporated by reference in its entirety. This application also claims priority to U.S. Provisional Application No. 61/770,719, filed on Feb. 28, 2013, and entitled "ATR GUIDE PINS FOR SLIDING NACELLE," the disclosure of which is incorporated by reference in its entirety. This application also claims priority to U.S. Provisional Application No. 61/770,729, filed on Feb. 28, 2013, and entitled "ATR AXIAL V-GROOVE," the disclosure of which is incorporated by reference in its entirety. This application also claims priority to U.S. Provisional Application No. 61/770,735, filed on Feb. 28, 2013, and entitled "ATR PYLON FAIRING INTEGRATION," the disclosure of which is incorporated by reference in its entirety.

BACKGROUND

Jet engines used in aerospace applications require periodic maintenance and repair. Typically, such jet engines are gas turbine engines surrounded by a nacelle. Part of the gas turbine engine surrounded by the nacelle is a core that includes fan, compressor, combustor, and turbine sections. A bypass duct passes through the gas turbine engine, and fan blades pass through the bypass duct. The core generates power that is used to propel an attached aircraft. The core is used to drive fan blades in the bypass duct to generate thrust, and core exhaust also creates thrust to propel the aircraft.

In order to facilitate maintenance and repair of the engine, known nacelles include doors that open outwards from the side of the nacelle, called "D-doors". When the engine needs repair or maintenance, the D-door is opened to provide access to engine parts. Some of the engine components that need regular maintenance or repair include the core and core externals. D-doors typically provide access to components of the core such as the combustor and turbine exhaust case that are not accessible from either the upstream or downstream ends of the gas turbine engine. Core externals include those devices that support the functions of the core, such as oil supply and drain, fuel supply, sensors, and wiring and connections to the sensors.

Externals pass through the bypass duct of the gas turbine engine. For example, fuel lines, oil supply and drain lines, and sensor leads must be connected to fuel tanks, oil supply systems, and controllers that are outside of the nacelle, respectively. Often, these externals are not suitable for routing through the bypass duct unprotected. Externals are often not structurally capable of supporting the loads that would be applied on them in the bypass duct. Furthermore, externals are often not aerodynamic, and routing through the bypass duct would result in undesirable drag on the bypass airstream. For this reason, externals are typically routed through a bifurcation, commonly referred to as a "bi-fi." A bi-fi is typically shaped as an airfoil having low to zero camber, and a chord direction parallel to the direction of the bypass airstream. The airfoil that makes up the bi-fi is hollowed out such that externals may be routed to the pylon or other sections of the aircraft without passing through the bypass airstream unprotected.

A common design of gas turbine engine has both an upper bi-fi and a lower bi-fi. The upper bi-fi shelters externals passing between the core and the pylon on which the engine is mounted. The lower bi-fi may be used for additional externals, or may be present to provide aerodynamic symmetry to the bypass duct.

D-doors are often arranged at or near the mid-point, axially, of the nacelle in which they are housed. D-doors often open upwards in the manner typically described as a "butterfly door." By opening the D-doors, a mechanic can gain access to the externals and/or core of the engine housed in the nacelle behind the D-door. Because the externals are housed not only within the nacelle (i.e., behind the D-door) but also within the bi-fi, known bi-fi designs are split such that they can also open in the "butterfly door" manner, or removed entirely. In other words, known bi-fi constructions include two identical halves, each half a mirror of the other side, which may be attached to one another to form a single airfoil surrounding the core externals of the gas turbine engine.

SUMMARY

A gas turbine engine includes a core, a first annular portion, a rail, and a second annular portion. The first annular portion is stationary and adapted for partially surrounding an engine core. The first annular portion includes a fore pylon connecting portion, and a fore bi-fi. The rail is coupled to the fore pylon portion and extending in the aft direction from the stationary portion. The second annular portion is arranged aft of the first portion and coupled to the rail. The second annular portion is movable along an engine core centerline between a closed position and at least one open position. The second annular portion comprises an aft bi-fi configured to engage with the fore bi-fi when the gas turbine engine is in the closed position.

DETAILED DESCRIPTION

A nacelle has a slidable aft portion that can be slid away from a stationary fore portion along rails. The slidable aft portion allows access to the core externals, and, when the gas turbine engine is in a fully opened position, even allows for the core to be dropped out to undergo more extensive maintenance, repair, or replacement. The slidable portion can include a downstream portion of a bi-fi, so that core externals are accessible even when the slidable portion is in a partially-opened position. Various other improvements and configurations are described herein that facilitate enhanced access to the engine.

Figure 1A:
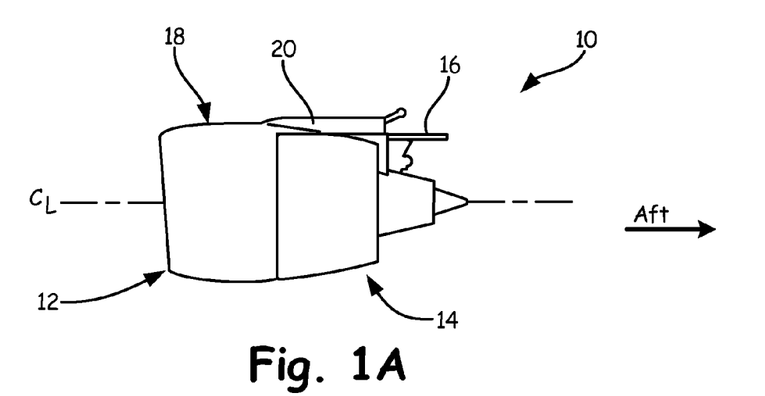
FIGS. 1A-1C are side views of a gas turbine engine with a slidable nacelle aft portion in closed, partially open, and fully open positions, respectively.
Figure 1B:
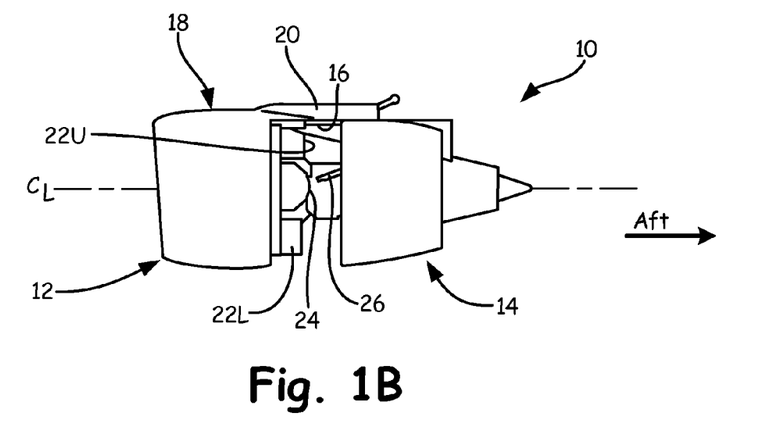
Figure 1C:
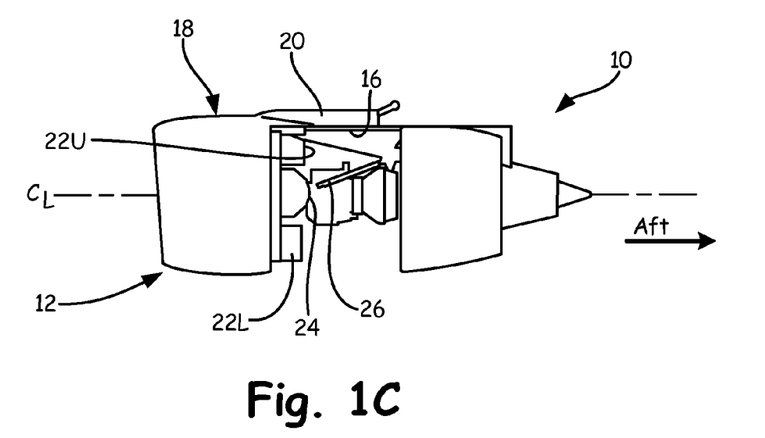

FIGS. 1A-1C illustrate gas turbine engine 10 in three potential positions. FIG. 1A illustrates gas turbine engine 10 in a fully closed position. This is the position gas turbine engine 10 would be in during operation. FIG. 1B illustrates gas turbine engine 10 in a partially open position. The partially open position may be sufficient for some repairs, modifications, or maintenance. FIG. 1C illustrates gas turbine engine 10 in a fully open position that may be helpful to carry out major repairs.

FIG. 1A is a side view of gas turbine engine 10. In FIG. 1A, the engine is in a fully closed or operational condition. Gas turbine engine 10 is made up of three primary components: stationary portion 12, slidable portion 14, and rail 16.

Stationary portion 12 includes fore nacelle 18, fore pylon 20, and engine core 24 (shown in FIGS. 1B and 1C). Fore nacelle 18 encloses various structures such as a fan, compressor sections, and/or bleed air systems that are well known in the art. In the embodiment shown in FIG. 1A, fore nacelle 18 is arranged about centerline $C_L$. Stationary portion 12 is attached to an aircraft (not shown) at fore pylon 20. Fore pylon 20 is a part of a larger pylon system that may include both stationary and movable components.

Slidable portion 14 is also centered about centerline $C_L$. Slidable portion 14 is mounted on rail 16, which extends parallel to centerline $C_L$. Rail 16 is stationary, in that it is fixed relative to stationary portion 12. Rail 16 may include a single track or multiple-track system. Slidable portion 14 is mounted to rail 16 such that slidable portion 14 may be moved fore and aft along rails 16. In some embodiments, rail 16 may be housed within part of a pylon system (not shown).

FIG. 1B is a side view of the gas turbine engine 10 shown in FIG. 1A. As shown in FIG. 1B, gas turbine engine 10 is in a partially open condition. Gas turbine engine 10 can be arranged in such partially open condition, starting from the closed position shown in FIG. 1A, by sliding slidable portion 14 along rail 16 in the aft direction. Gas turbine engine 10 includes the components previously described with respect to FIG. 1A. In addition, the view shown in FIG. 1B illustrates upper fore bi-fi 22U, lower fore bi-fi 22L, core 24, and externals 26.

Upper fore bi-fi 22U and lower fore bi-f 22L are fore portions of two bifurcations (commonly referred to as "bi-fi"s) that extend outward from core 24 to house externals 26. Upper fore bi-fi 22U and lower fore bi-fi 22L extend radially outward from centerline $C_L$ through a bypass duct (not shown). Upper fore bi-fi 22U and lower fore bi-fi 22L each form the leading edge of a larger bi-fi structure, described in more detail with respect to FIG. 2.

Core 24 is a portion of gas turbine engine 10 that is arranged along centerline $C_L$. Core 24, which typically includes combustor and turbine sections, generates power and thrust. Combustion of fuel and compressed air in core 24 can be used to do work on a core airstream (not shown), which can in turn be used to generate thrust or drive other components of gas turbine engine 10.

Externals 26 are used to support the functions of core 24. For example, externals include (but are not limited to) oil supply, oil sump, fuel supply, and sensors. Externals 26 are arranged such that they are circumferentially aligned with upper fore bi-fi 22U or lower fore bi-fi 22L. In this way, when gas turbine engine 10 is in a closed position, as described previously with respect to FIG. 1A, externals 26 are housed within a bi-fi structure as described with respect to FIG. 2 and protected from bypass airflow during engine operation.

As can be seen in FIG. 1B, moving slidable portion 14 in the aft direction results in access to core 24 and externals 26. Thus, slidable portion 14 includes all portions of gas turbine engine 10 that are radially outwards from core 24 behind a certain point in the aft direction and under rail 16. Upon translation of slidable portion 14 along rail 16 in the aft direction, no duct, liner, or housing remains in place to inhibit access by a mechanic or inspector.

A mechanic may desire to put gas turbine engine 10 into the partially-open position shown in FIG. 1B in order to service the engine. Often, for light maintenance or minor repairs, it is not necessary to remove (or "drop") the core. Instead, a mechanic may be able to diagnose, maintain, or make light repairs by gaining access to core 24 or externals 26, even though they are still mounted to an aircraft (not shown). By sliding slidable portion 14 along rail 16, some portions of core 24 and externals 26 are easily accessible. Furthermore, the configuration shown in FIG. 1B provides access from a wide variety of angles to core 24 and externals 26, free from obstructions and interference associated with hinged doors or access panels.

FIG. 1C shows gas turbine engine 10 of FIGS. 1A-1B in a "fully open" position. FIG. 1C illustrates the same components previously described with respect to FIG. 1B. In the engine configuration shown in FIG. 1C, slidable portion 14 has been moved so far aft that it is possible to access core 24 and externals 26 along their entire axial length. In fact, in the configuration shown in FIG. 1C, it is possible to drop core 24 out of engine 10. Dropping core 24 is often beneficial for significant maintenance or engine overhauls. In the configuration shown in FIG. 1C, it is possible to drop core 24 without having to deconstruct any blades, vanes, or other structures present in either stationary portion 12 or slidable portion 14.

In alternative embodiments, fore nacelle 18 need not be centered about centerline $C_L$. Various other externals 26 may be present or missing from alternative embodiments. Rail 16 may not extend linearly in the aft direction, but may be configured such that slidable portion 14 can be moved along core 24 in any direction to enhance access to core 24 and/or externals 26.

Figure 2:
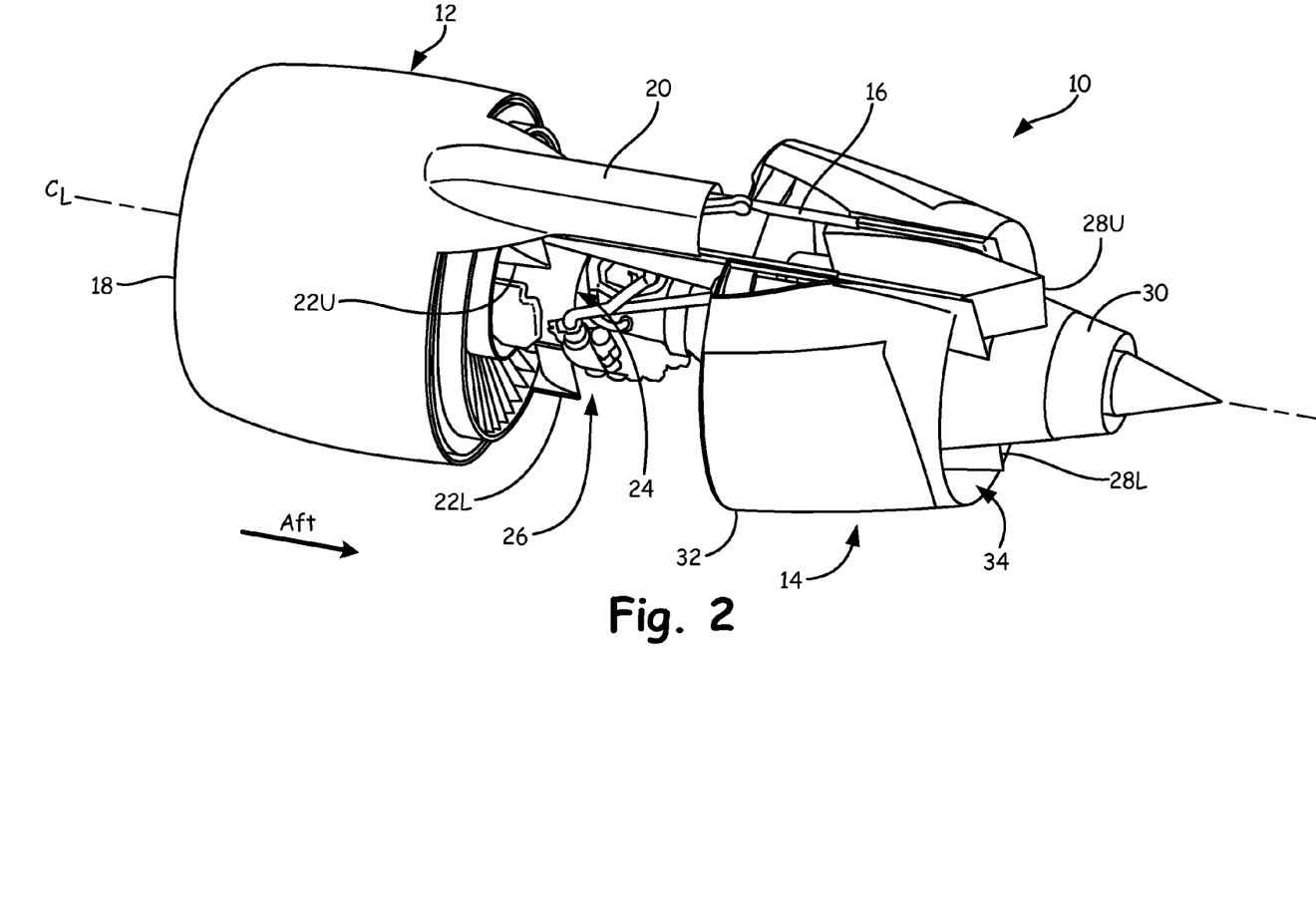
FIG. 2 is a perspective view of the gas turbine engine of FIGS. 1A-1C, illustrating the rail and bi-fi systems.

FIG. 2 is a perspective view of gas turbine engine 10, as previously described with respect to FIGS. 1A-1C. FIG. 2 shows gas turbine engine 10 with the slidable portion 14 moved aft from the closed position. FIG. 2 illustrates upper aft bi-fi 28U and lower aft bi-fi 28L, which are both a part of slidable portion 14. Further, FIG. 2 illustrates Inner Fixed Portion ("IFS") 30 and aft nacelle 32. IFS 30 is an annular structure that separates core 24 from bypass duct 34, which is defined by IFS 30 and aft nacelle 32.

Rail 16 shown in FIG. 2 is a two-track system that is affixed to fore pylon 20. Slidable portion 14 is attached to rail 16 such that slidable portion 14 is movable along rail 16 along centerline $C_L$ in the aft direction.

Upper aft bi-fi 28U is configured such that, when gas turbine engine 10 is in the closed position previously described with respect to FIG. 1A, upper aft bi-fi 28U engages with upper fore bi-fi 22U to surround at least a portion of externals 26. Likewise, in the closed position lower aft bi-fi 28L engages with lower fore bi-fi 22L to surround at least a portion of externals 26. The structures formed by each pair of engaged bi-fis forms an airfoil that passes radially through bypass duct 34. Externals 26 are housed within the combined bi-fi structures to protect the externals and reduce aerodynamic drag that would be caused by exposed externals 26 within bypass duct 34.

Although rail 16 is shown as a two-track system in FIG. 2, various other configurations of rail 16 are possible. For example, in alternative embodiments, rail 16 may be a single track.

Figure 3A:
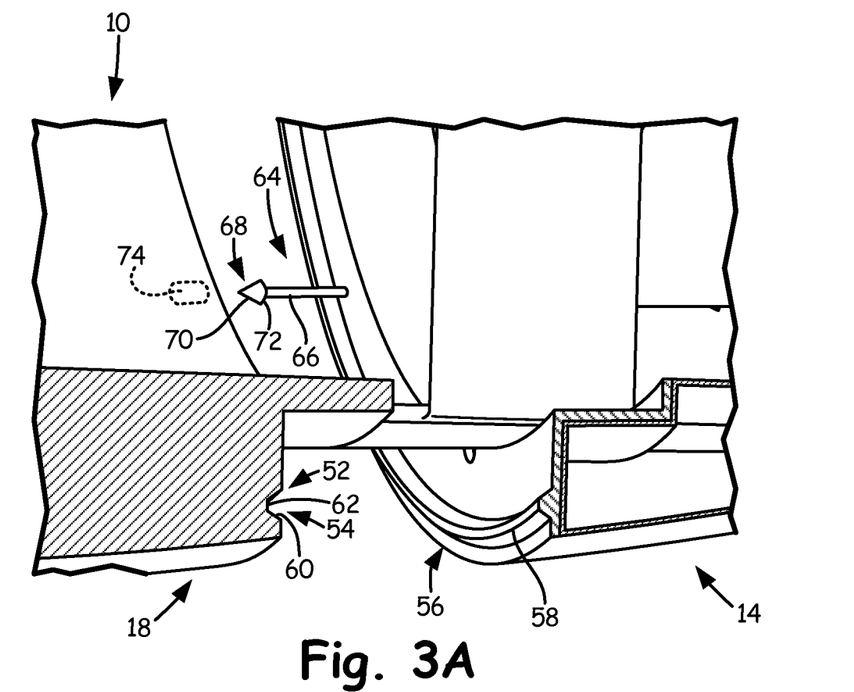
FIG. 3A is a perspective view, in section, of mating portions of the fore nacelle and slidable portions.

FIG. 3A is a perspective view, in section, of mating portions of fore nacelle 18 and slidable portion 14 in fully open position. Gas turbine engine 10, in addition to the components described in FIGS. 1A, 1B, 1C, and 2, includes axial groove 54, rib 58, guide pin 64 and locking mechanism 74. Fore nacelle 18 includes first inner radial surface 52, axial groove 54, and locking mechanism 74. Slidable portion 14 includes second inner radial surface 56, rib 38, and guide pin 64. Axial groove 54 includes side walls 60 and base wall 62. Axial groove 54 and rib 58 are configured to engage with each other when gas turbine engine 10 is in a closed position. Guide pin 64 includes pin shaft 66, and spearhead 68. Spearhead 68 includes front segment 70 and back segment 72.

Similar to the corresponding components of gas turbine engine 10, as described previously with respect to FIGS. 1A, 1B, 1C, and 2, slidable portion 14 can be in one of three positions, those being a fully closed, partially open, or fully open position. When partially or fully open, as depicted in FIG. 3A, first inner radial surface 52 on fore nacelle 18 is spaced apart from second inner radial surface 56 on slidable portion 14.

First inner radial surface 52 is an aft facing surface, and includes axial groove 54 and locking mechanism 74. Axial groove 54 extends axially inward (forward) from first inner radial surface 52 into fore nacelle 18. Axial groove 54 forms a continuous circle about the diameter of first inner radial surface 52. In alternative embodiments, axial groove 54 can form a discontinuous or fragmented circle about the diameter of first inner radial surface 52. Second inner radial surface 56 is a forward facing surface that, in the closed position, engages with first inner radial surface 52.

Locking mechanism 74 is disposed within first inner radial surface 52, spaced apart from guide pin 64 on second inner radial surface 56 in the partially open and fully open positions. Locking mechanism 74 extends into fore nacelle 18. Locking mechanism is configured to receive and engage guide pin 64.

Second inner radial surface 56 is configured to engage axial groove 54. Specifically, rib 58 is the portion of second inner radial surface 56 that engages axial groove 54. Rib 58 extends axially outward (forward) from second inner radial surface 56 and is spaced apart from axial groove 54 on first inner radial surface 52 in the partially open and fully open positions. Rib 58 can be machined along with slidable portion 14. Alternatively, rib 58 can be machined separately and mechanically fastened to slidable portion 14. The dimensions of rib 58 can be configured to substantially conform to and mate with the dimensions of axial groove 54. Rib 58 forms a continuous circle, commensurate with axial groove 54 about the diameter of second inner radial surface 56. In alternative embodiments, rib 58 can form a discontinuous circle about the diameter of second inner radial surface 56.

Second inner radial surface 56 also includes guide pin 64. Guide pin 64 extends axially outward (forward) from second inner radial surface 56. Guide pin 64 includes pin shaft 66 and spearhead 68. Pin shaft 66 is cylindrically shaped and can take on other shapes in different embodiments. Spearhead 68 includes front segment 70 and back segment 72. Front segment 70 is conically shaped, but can take on other shapes in different embodiments, and is tapered to point toward first inner radial surface 52. Back segment 72 is also conically shaped, and can take on different shapes in alternative embodiments, and is tapered to point toward second inner radial surface 56.

In operation, as described with respect to FIGS. 1A, 1B, 1C and 2 above, gas turbine engine 10 can be in fully or partially open position to expose engine core 24 or in a closed position during normal operation mode, (e.g., during flight). Gas turbine engine 10 moves from an open position to a closed position as described previously with respect to FIGS. 1A, 1B, 1C, and 2. As slidable portion 14 slides towards fore nacelle 18, rib 58 engages axial groove 54. Side walls 60, being nearly v-shaped, can help to guide rib 58 into axial groove 54. Base wall 62 provides a platform for rib 58 to engage axial groove 54. This can help improve the stability of the engagement between axial groove 54 and rib 58. Rib 58 and axial groove 54 form a radial engagement. That is, during normal operation mode (e.g., during flight), rib 58 and axial grove 54 are radially biased against each other. Rib 58 is configured to substantially conform to the dimensions of axial groove 54 thus providing a secure radial engagement between fore nacelle 18 and slidable portion 14. When axial groove 54 and rib 58 are fully engaged, first inner radial surface 52 and second inner radial surface 56 are in full contact with each other. In other embodiments of gas turbine engine 10 first inner radial surface 52 and second inner radial surface 56 may not be in full contact with one another when the engine is in the closed position around the full circumference of the engine. Although FIG. 3A shows, and the previous text describes, axial groove 54 as located on fore nacelle 18, one having ordinary skill in the art will appreciate that axial groove 54 could also be located on slidable portion 14 and rib 58 arranged on fore nacelle 18 without departing from the scope of the invention.

There are several advantages to using axial groove 54 and rib 58 to secure fore nacelle 18 and slidable portion 14 of gas turbine engine 10 including the following non-limiting examples. Because fore nacelle 18 and slidable portion 14 are radially engaged in the closed position, the two portions are less likely to be radially displaced during normal operation modes, (e.g., during flight). The engagement of axial groove 54 and rib 58 can also create a seal between fore nacelle 18 and slidable portion 14. The seal is advantageous because it can help to prevent bypass airflow from being lost at the intersection of the two portions, thus increasing the overall efficiency of gas turbine engine 10. Similarly, the seal can also prevent outside air from entering gas turbine engine 10 at the intersection of the two portions. A further advantage of the system is that axial groove 54 and rib 58 can help to position fore nacelle 18 and slidable portion 14 such that the outer surfaces of each portion are flush with each other. This can provide gas turbine engine 10 with a smooth and virtually continuous surface when in fully closed position. Accordingly, unnecessary drag and stress on gas turbine engine 10 can be reduced during flight.

Guide pin 64 engages locking mechanism 74 as rib 58 engages axial groove 54. Locking mechanism 74 can receive front segment 70 and back segment 72. Locking mechanism 74 then engages back segment 72 which places a back load on guide pin 64 and can help ensure proper engagement between fore nacelle 18 and slidable portion 14. Although locking mechanism 74 and guide pin 64 are shown as disposed on first inner radial surface 52 and second inner radial surface 56 respectively, one having ordinary skill in the art will recognize that locking mechanism 74 and guide pin 64 could be disposed on second inner radial surface 56 and first inner radial surface 52 respectively, without departing from the scope of this invention. Further, although fore nacelle 18 and slidable portion 14 are depicted as having a single locking mechanism 74 and a single guide pin 64, one having ordinary skill in the art will recognize that a plurality of locking mechanisms 74 and guide pins 64 can be included without departing from the scope of the invention.

Figure 3B:
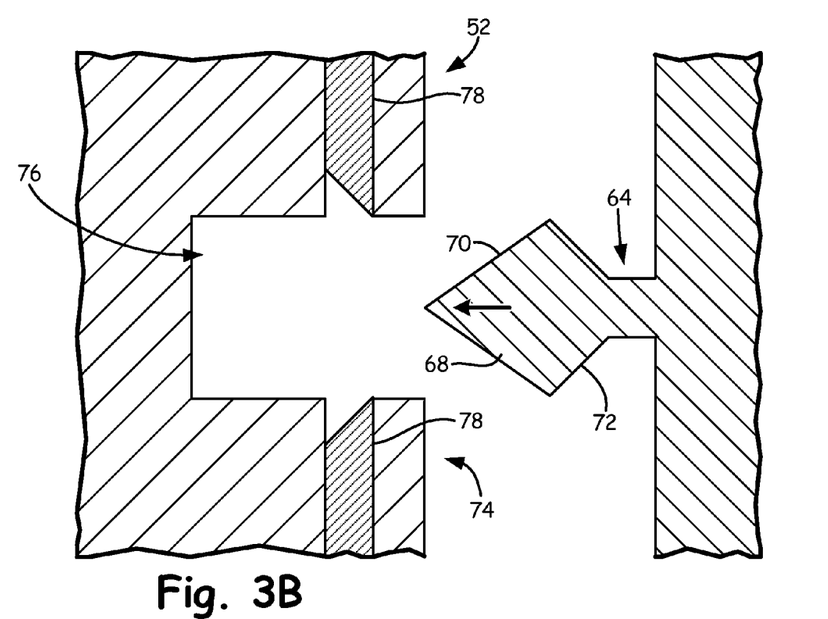
FIGS. 3B-3C are enlarged side views of the locking mechanism shown in FIG. 3A, in partially open and closed positions, respectively.

FIG. 3B is an enlarged side view of locking mechanism 74 and guide pin 64 as described above with respect to FIG. 3A. Locking mechanism 74 includes well 76 and collars 78. In FIG. 3B, gas turbine engine 10 is in a partially open position. Thus, guide pin 64 is axially spaced from well 76. Locking mechanism 74 is configured to be disposed within first inner radial surface 52 and receive guide pin 64 when gas turbine engine 10 is in the closed position. Prior to engaging guide pin 64, collars 78 are recessed within locking mechanism 74 which leaves well 76 open.

Figure 3C:
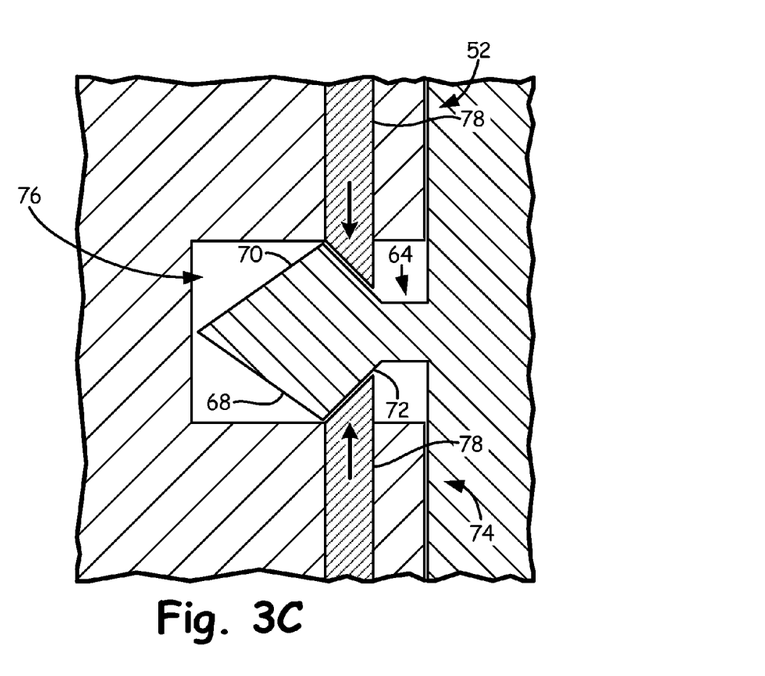

FIG. 3C shows the locking mechanism 74 of FIG. 3B with gas turbine engine 10 in the closed position. Slidable portion 14 (FIGS. 1A-1C, 2) is brought into mating engagement with fore nacelle 18, and spearhead 68 engages locking mechanism 74. As a result of its conical shape, front segment 70 is guided into well 76. When spearhead 68 is fully encompassed within well 76, collars 78 are deployed to engage back segment 72. Collars 78 are configured to engage back segment 72 by substantially matching the profile of back segment 72. In this way, collars 78 prevent axial displacement of guide pin 64. Collars 78 can be deployed using a suitable actuator (not shown).

There are several advantages to using guide pin 64 and locking mechanism 74 to secure fore nacelle 18 and slidable portion 14 including the following non limiting examples. When back segment 72 is engaged by collars 78 a back load is placed on guide pin 64 to ensure proper engagement of fore nacelle 18 and slidable portion 14 which can help reduce the risk of the two portions separating during flight. Additionally, guide pin 64 and locking mechanism 74 can help to facilitate proper alignment of axial groove 54 and rib 58 as well as secure the connection between them. A further advantage is that guide pin 64 and locking mechanism 74 can help to position fore nacelle 18 and slidable portion 14 such that the outer surfaces of each portion are flush with each other. This can provide gas turbine engine 10 with a smooth and virtually continuous surface when in fully closed position. Accordingly, unnecessary drag and stress on gas turbine engine 10 can be reduced during flight.

Figure 4A:
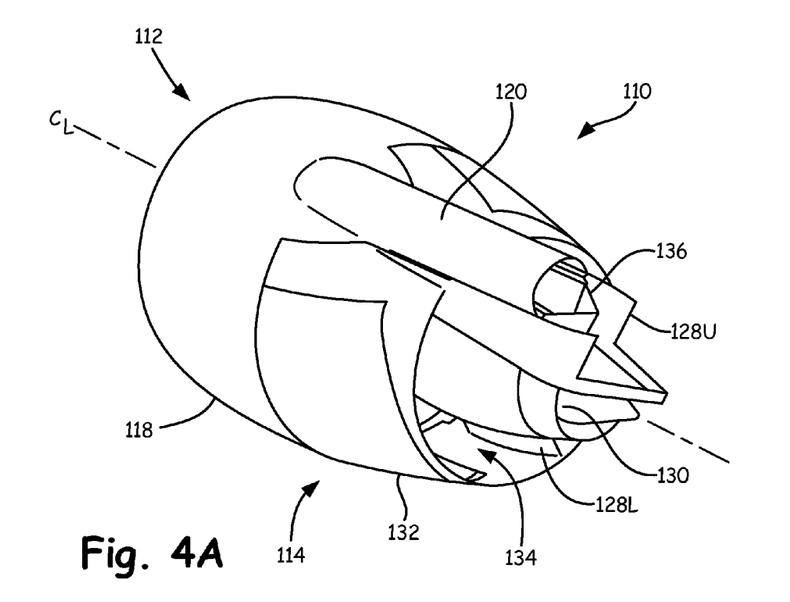
FIG. 4A is a perspective view of a gas turbine engine in a closed configuration, the engine having a slidable nacelle aft portion that includes an aft pylon.
Figure 4B:
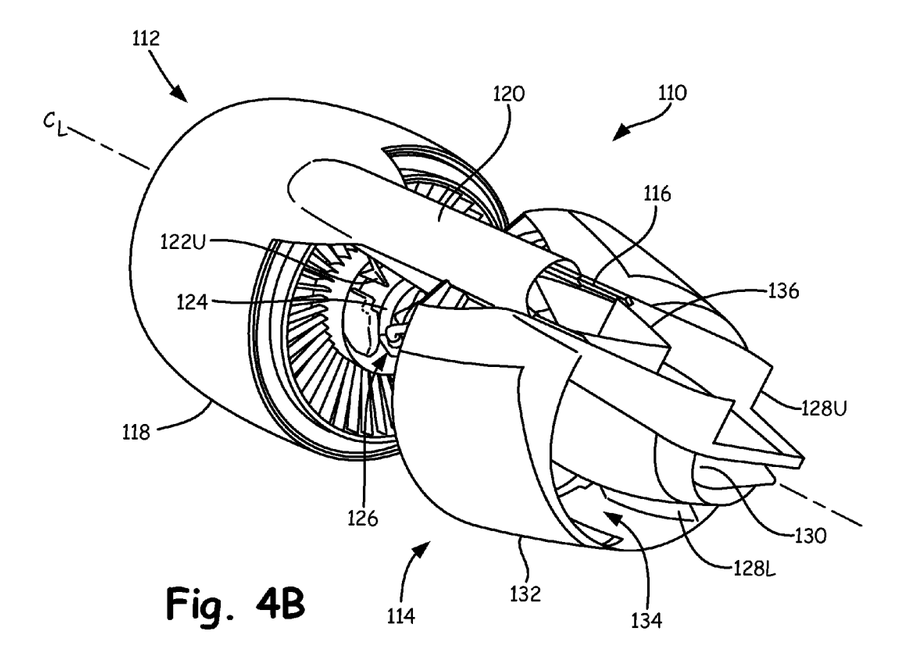
FIG. 4B is a perspective view of the gas turbine engine of FIG. 4A in an open configuration.

FIGS. 4A-4B show gas turbine engine 110, which includes stationary portion 112, slidable portion 114, and rail 116. FIG. 4A shows gas turbine engine 110 in the closed position. Gas turbine engine 110 is similar to gas turbine engine 10 of FIGS. 1A-1C and 2. However, gas turbine engine 110 also includes aft pylon 136, which was not present in gas turbine engine 10. Aft pylon 136 is slidable to provide access to additional components within gas turbine engine 110.

The components that make up gas turbine engine 110 are substantially similar to the components previously described with respect to gas turbine engine 10 of FIGS. 1A-1C and FIG. 2. Stationary portion 112 includes fore nacelle 118, fore pylon 120, upper fore bi-fi 122U, lower fore bi-fi (not shown in this perspective), core 124, and externals 126. Slidable portion 114 includes upper aft bi-fi 128U, lower aft bi-fi 128L, IFS 130, and aft nacelle 132. IFS 130 and aft nacelle 132 define bypass duct 134.

In addition to those components already described in detail previously, gas turbine engine 110 includes aft pylon 136. Aft pylon 136 is a part of slidable portion 114—that is, aft pylon travels along rail 116 when gas turbine engine 110 is rearranged between open, partially open, and closed positions. In the embodiment shown in FIG. 4A, aft pylon 136 is connected to aft nacelle 132, such that translation of aft nacelle 132 along rail 116 causes an equal movement of aft pylon 136. Because slidable portion 114 is fully forward (that is, gas turbine engine 110 is in a closed configuration), aft pylon 136 engages with fore pylon 120. When engaged, fore pylon 120 and aft pylon 136 cooperate to house various structures such as supply lines, cables, and/or structural supports from any surrounding airstream. Fore pylon 120 and aft pylon 136 may simply have complementary shapes to fit together, or may be fastened to one another with a variety of known fastening mechanisms (not shown).

Aft pylon 136 cooperates with fore pylon 120 to house various components that pass between gas turbine engine 110 and a related aircraft (not shown). Such components may include structural supports to affix gas turbine engine 110 to an aircraft wing, or fuel, oil, and/or electronics conduits or passages between gas turbine engine 110 and various remote systems, none of which are shown in FIG. 4A. In the event that these various components need maintenance, replacement, or attention of any other variety from a mechanic, placing gas turbine engine 110 in a partially open or open state facilitates access to those components.

Furthermore, aft pylon 136 increases the structural integrity of slidable portion 114. Aft pylon 136 binds together those portions of aft nacelle 132 that are attached to rail 116. This reduces the potential for aft nacelle 132 to exert stresses on rail 116, and prevents distension of aft nacelle 132.

FIG. 4B shows gas turbine engine 110 of FIG. 4A in an open position. As previously described with respect to FIG. 4A, aft pylon 136 is slidable to provide access to additional components within gas turbine engine 110. As shown in FIG. 4B, gas turbine engine 110 is at least partially open, such that aft pylon 136 is separated from fore pylon 120. Thus, a mechanic is able to inspect, repair, or replace components that were surrounded by the engaged structure shown with respect to FIG. 4A.

In alternative embodiments, aft pylon 136 may be configured to move along rail 116 independently of aft nacelle 132. In further alternative embodiments, aft pylon 136 need not be configured to travel along rail 116 at all, but may instead be detachable from fore pylon 120 when aft nacelle 132 is not in the closed position.

Figure 5A:
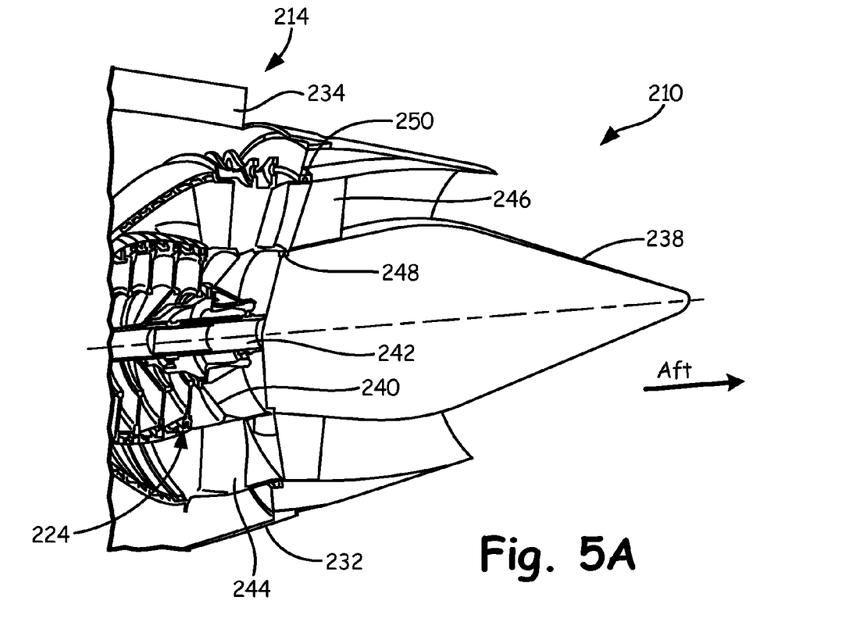
FIG. 5A is a perspective view of a nozzle plug connected to a slidable portion and engaged with a turbine.
Figure 5B:
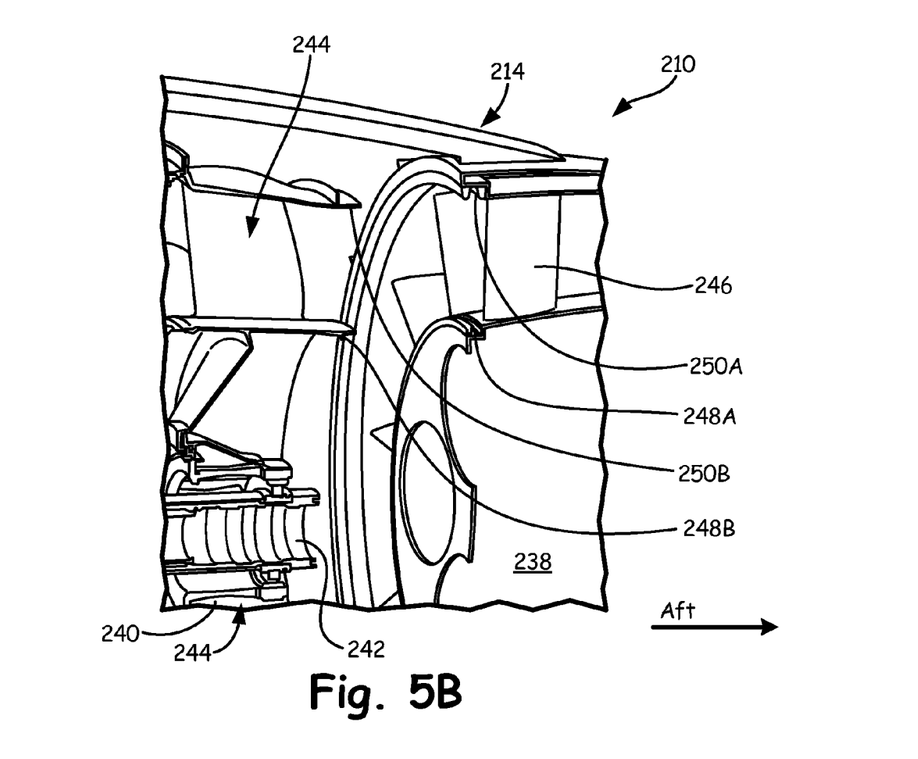
FIG. 5B is a perspective view of the nozzle plug, slidable portion, and turbine exhaust case of FIG. 5A, with the slidable portion and nozzle plug disengaged from the turbine.

FIGS. 5A-5B illustrate the aftmost portion of gas turbine engine 210. In particular, FIGS. 5A-5B show a nozzle plug that is configured to complement the slidable portions of gas turbine engines previously described with respect to FIGS. 1A-1C, 2, and 4A-4B. Nozzle plugs are used in gas turbine engines to route exhaust gases through the turbine exhaust case. Nozzle plug geometry can affect aerodynamic performance and engine acoustics. It is desirable to have the nozzle plug be movable with the slidable portion, so that a wide variety of nozzle plug geometries can be used without risking interference between the slidable portion and the nozzle plug that may have occurred if the nozzle plug remained affixed to the engine core.

FIG. 5A is a perspective view of gas turbine engine 210 in the closed position. Gas turbine engine 210 includes many similar components to gas turbine 10 and gas turbine engine 110 previously described. In particular, gas turbine engine 210 includes core 224, aft nacelle 232, bypass duct 234, nozzle plug 238, turbine 240, shaft 242, turbine exhaust case 244, and strut 246. Furthermore, gas turbine engine 210 includes inner seal 248 and outer seal 250.

Core 224 is circumscribed by aft nacelle 232, which is slidable in the aft direction. Bypass duct 234 is a plenum through which a bypass airstream can flow. Nozzle plug 238 is arranged aft of turbine 240. Turbine 240 rotates about shaft 242, and turbine exhaust case 244 provides egress for exhaust gases from turbine 240. Strut 246 passes through turbine exhaust case 244.

Aft nacelle 232 is slidable in the fore and aft directions. Core 224 engages with nozzle plug 238. Core 224 includes turbine section 240 and shaft 242. Core 224 can exhaust air radially outward of nozzle plug 238 from centerline $C_L$ through turbine exhaust case (TEC) 244. TEC 244 is a passage from turbine section 240 in the aft direction, supported by struts 246. Bypass air is routed through bypass duct 234, which is located radially further outward from turbine exhaust case 244.

Nozzle plug 238 engages with core 224 at inner seal 248. Likewise, TEC 244, which is fixed to core 224, engages with the slidable portion 214 at outer seal 250. As shown in FIG. 5A, inner seal 248 and outer seal 250 are both W-shaped seals. Thus, an airstream passing through turbine 240 is not able to pass through inner seal 248 to nozzle plug 238 or turbine exhaust case 244. Likewise, an airstream is not able to escape TEC 244 through either of inner seal 248 nor outer seal 250.

Core 224 is often left in place while slidable portion 214 is moved in the aft direction, as previously described with respect to earlier figures, in order to facilitate maintenance, inspection, or repair of gas turbine engine 210. Nozzle plug 238 is shaped to accomplish various objectives, such as to maximize efficiency of gas turbine engine 210 or reduce exhaust noise during engine operation. Often, as shown in FIG. 5A, nozzle plug 238 must be movable with slidable portion 214 or else it will impinge movement of slidable portion 214 in the aft direction.

Inner seal 248 and outer seal 250 enable nozzle plug 238 to be sealed to core 224 during operation, but removed during partially open or open conditions (i.e., when slidable portion 214 is moved in the aft direction from the position shown in FIG. 4A).

In FIG. 5B, gas turbine engine 210 is in a partially open condition. Nozzle plug 238 is a part of slidable portion 214, and thus nozzle plug 238 is axially spaced aft from core 224. This arrangement illustrates the functions of inner seal 248 and outer seal 250 of FIG. 5A.

Inner seal 248 includes inner seal outer portion 248A on nozzle plug 238 and inner seal inner portion 248B on TEC 244. When gas turbine engine 210 is in the closed position, as previously described with respect to FIG. 5A, inner seal outer portion 248A and inner seal inner portion 248B engage to prevent ingress or egress of air at inner seal 248. Likewise, outer seal outer portion 250A on TEC 244 and outer seal inner portion 250B on slidable portion 214 engage to prevent ingress or egress of air at outer seal 250 of FIG. 5A.

During repair, maintenance, and/or inspection, it is not necessary to maintain an airtight seal between inner seal outer portion 248A and inner seal inner portion 248B, nor between outer seal outer portion 250A and outer seal inner portion 250B. Furthermore, in some embodiments separation of nozzle plug 238 from core 224 with slidable portion 214 is beneficial. The structures described above provide for a movable nozzle plug that nonetheless prevents air leakage between the plena separated by inner seal 248 and the plena separated by outer seal 250.

Discussion of Possible Embodiments

The following are non-exclusive descriptions of possible embodiments of the present invention.

A gas turbine engine includes a core, a first annular portion, a rail, and a second annular portion. The first annular portion is stationary and adapted for partially surrounding an engine core. The first annular portion includes a fore pylon connecting portion, and a fore bi-fi. The rail is coupled to the fore pylon portion and extending in the aft direction from the stationary portion. The second annular portion is arranged aft of the first portion and coupled to the rail. The second annular portion is movable along an engine core centerline between a closed position and at least one open position. The second annular portion comprises an aft bi-fi configured to engage with the fore bi-fi when the gas turbine engine is in the closed position.

The gas turbine engine of the preceding paragraph can optionally include, additionally and/or alternatively, any one or more of the following features, configurations and/or additional components:

The fore bi-fi and the aft bi-fi may be configured to enclose a plurality of external core features in the closed position.

The fore bi-fi and the aft bi-fi may be disengaged to allow access to a plurality of external core features in a partially open position.

The first annular portion and the second annular portion may be separated by a distance sufficient to allow removal of the engine core when the second annular portion is arranged in the fully open position.

The fore bi-fi and the aft bi-fi may form an airfoil having low camber in the closed position.

The second annular portion may further comprise an aft pylon connecting portion configured to engage with the fore pylon connecting portion when the gas turbine engine is in the closed position.

The gas turbine engine may further comprise an engagement mechanism capable of engaging the second annular portion and the first annular portion when the second annular portion is arranged in the closed position.

The rail may be a dual-track system.

According to another embodiment, a method for obtaining access to components of a gas turbine engine includes disengaging a locking mechanism housed in a stationary portion, and sliding a slidable portion in an aft direction from a closed position to a partially open position. The stationary portion includes a fore bi-fi portion, and the slidable portion includes an aft bi-fi portion configured to engage with the fore bi-fi portion when the slidable portion is in the closed position.

The method of the preceding paragraph can optionally include, additionally and/or alternatively, any one or more of the following features, configurations, steps, and/or additional components:

A plurality of engine externals may be accessible in the partially open position.

The method may also include sliding the slidable portion in the aft direction to a fully open position. A core of the gas turbine engine is accessible in the fully open position. The method may also include dropping the core from the gas turbine engine in the fully open position.

The method may also include sliding the slidable portion in a fore direction to the closed position.

The method may also include engaging the locking mechanism.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a first annular portion that is stationary and adapted for partially surrounding an engine core, wherein the first annular portion includes:
   a fore pylon connecting portion; and
   a fore bi-fi comprising an upper fore portion located radially above the engine core, and a lower fore portion located radially below the engine core;
   a rail coupled to the fore pylon portion and extending in the aft direction from the stationary portion; and
   a second annular portion, aft of the first portion and coupled to the rail, the second annular portion being movable along an engine core centerline between a closed position and at least one open position, wherein the second annular portion comprises an aft bi-fi comprising an upper aft portion and a lower aft portion, wherein the aft bi-fi is configured to engage with the fore bi-fi when the gas turbine engine is in the closed position.

2. The gas turbine engine of claim 1, wherein the fore bi-fi and the aft bi-fi are configured to enclose a plurality of external core features in the closed position.

3. The gas turbine engine of claim 1, wherein the fore bi-fi and the aft bi-fi are disengaged to allow access to a plurality of external core features in a partially open position.

4. The gas turbine engine of claim 1, wherein the first annular portion and the second annular portion are separated by a distance sufficient to allow removal of the engine core when the second annular portion is arranged in the fully open position.

5. The gas turbine engine of claim 1, wherein the fore bi-fi and the aft bi-fi form an airfoil having low camber in the closed position.

6. The gas turbine engine of claim 5, wherein the second annular portion further comprises an aft pylon connecting portion configured to engage with the fore pylon connecting portion when the gas turbine engine is in the closed position.

7. The gas turbine engine of claim 1, and further comprising an engagement mechanism capable of engaging the second annular portion and the first annular portion when the second annular portion is arranged in the closed position.

8. The gas turbine engine of claim 1, wherein the rail comprises a dual-track system.

9. A method for obtaining access to components of a gas turbine engine, the method comprising:
   disengaging a first annular portion from a second annular portion, wherein the first annular portion includes a fore bi-fi, and wherein the fore bi-fi comprises an upper fore portion located radially above the engine core, and a lower fore portion located radially below the engine core; and
   sliding the second annular portion in an aft direction from a closed position to a partially open position, wherein the second annular portion includes an aft bi-fi comprising an upper aft portion and a lower aft portion, wherein the aft bi-fi is configured to engage with the fore bi-fi when the second annular portion is in the closed position.

10. The method of claim 9, wherein a plurality of engine externals are accessible in the partially open position.

11. The method of claim 10, and further comprising sliding the second annular portion in the aft direction to a fully open position.

12. The method of claim 11, wherein a core of the gas turbine engine is accessible in the fully open position.

13. The method of claim 12, and further comprising dropping the core from the gas turbine engine in the fully open position.

14. The method of claim 9, and further comprising sliding the second annular portion in a fore direction to the closed position.

15. The method of claim 14, and further comprising engaging the second annular portion and the first annular portion.

* * * * *